(12) United States Patent
Abdulrahim et al.

(10) Patent No.: US 11,407,659 B1
(45) Date of Patent: Aug. 9, 2022

(54) DESALINATION AND COOLING SYSTEM

(71) Applicant: KUWAIT INSTITUTE FOR SCIENTIFIC RESEARCH, Safat (KW)

(72) Inventors: Hassan Kamal Mohamed Abdulrahim, Safat (KW); Mansour Ahmed, Safat (KW)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 0 days.

(21) Appl. No.: 17/372,046

(22) Filed: Jul. 9, 2021

(51) Int. Cl.
 *C02F 1/44* (2006.01)
 *B01D 61/00* (2006.01)
 *C02F 103/08* (2006.01)

(52) U.S. Cl.
 CPC ............ *C02F 1/445* (2013.01); *B01D 61/005* (2013.01); *B01D 2313/22* (2013.01); *B01D 2313/36* (2013.01); *C02F 2103/08* (2013.01); *C02F 2303/10* (2013.01)

(58) Field of Classification Search
 CPC .... B01D 61/002; B01D 61/005; B01D 69/02; B01D 2311/25; B01D 2311/2626; B01D 61/08; B01D 61/00; C01F 9/00
 See application file for complete search history.

(56) References Cited

U.S. PATENT DOCUMENTS

| | | | |
|---|---|---|---|
| 3,617,547 A * | 11/1971 | Halff | B01D 61/422 210/638 |
| 4,280,331 A | 7/1981 | Yoshii et al. | |
| 11,035,581 B1 | 6/2021 | Abdulrahim et al. | |
| 2006/0144789 A1 * | 7/2006 | Cath | B01D 61/58 210/641 |

(Continued)

FOREIGN PATENT DOCUMENTS

| | | |
|---|---|---|
| CN | 201634527 | 11/2010 |
| CN | 104180555 A | 12/2014 |

(Continued)

OTHER PUBLICATIONS

Wang, "Proposal and analysis of a high-efficiency combined desalination and refrigeration system based on the LiBr—H2O absorption cycle—Part 1: System configuration and mathematical model," Energy Conversion and Management, vol. 52, Issue 1, Jan. 2011, pp. 220-227.

International Search & Written Opinion in PCT/IB2022/050829, dated Mar. 23, 2022.

(Continued)

*Primary Examiner* — Chester T Barry
(74) *Attorney, Agent, or Firm* — Nath, Goldberg & Meyer; Richard C. Litman

(57) ABSTRACT

A desalination and cooling system includes a single effect water-lithium bromide vapor absorption cycle (VAC) system and a forward osmosis with thermal-recovery (FO-TR) desalination system. The FO system employs a Thermo- (Continued)

Responsive Draw Solution (TRDS) Fresh water flows from the FS to the TRDS without application of pressure on the saline water. Afterwards, only thermal energy is required to extract fresh water from the TRDS and recover or regenerate the draw solution. The VAC system serves as a cooling source for cooling or air conditioning applications, generating waste heat as a result. The waste heat generated by the VAC system provides the thermal energy needed to recover the draw solution (DS). The VAC system can be powered by low-grade heat sources like solar thermal energy.

7 Claims, 3 Drawing Sheets

(56) References Cited

U.S. PATENT DOCUMENTS

| | | | |
|---|---|---|---|
| 2010/0033192 A1* | 2/2010 | Somfalvy | F16K 37/0083 |
| | | | 324/555 |
| 2011/0084025 A1 | 4/2011 | Tominaga | |
| 2015/0014232 A1* | 1/2015 | McGinnis | B01D 61/364 |
| | | | 210/180 |
| 2016/0252279 A1 | 9/2016 | Hui | |
| 2019/0161366 A1 | 5/2019 | Al-Azazmeh et al. | |
| 2019/0224623 A1* | 7/2019 | Fan | C09K 8/60 |
| 2021/0002148 A1* | 1/2021 | Sato | B01D 61/005 |
| 2021/0024395 A1* | 1/2021 | Revanur | B01D 61/42 |
| 2021/0198136 A1* | 7/2021 | Jani | C02F 9/00 |
| 2021/0275967 A1* | 9/2021 | Goodman | B01D 61/002 |
| 2021/0316250 A1* | 10/2021 | Osato | B01D 61/005 |

FOREIGN PATENT DOCUMENTS

| | | |
|---|---|---|
| CN | 106500395 A | 3/2017 |
| CN | 107098419 A | 8/2017 |
| CN | 107655235 A | 2/2018 |
| JP | 2010-36174 A | 2/2010 |
| JP | 2017113675 A | 6/2017 |

OTHER PUBLICATIONS

Harby, K. et al., "A novel combined reverse osmosis and hybrid absorption desalination-cooling system to increase overall water recovery and energy efficiency," J. of Cleaner Production, 287: 125014 (Nov. 9, 2020).

Boman, D. B. et al., "Absorption heat pump cycles for simultaneous space conditioning and graywater purification," Applied Thermal Engineering, 167: 114587 (Oct. 26, 2019).

* cited by examiner

DESALINATION AND COOLING SYSTEM

BACKGROUND

1. Field

The disclosure of the present patent application relates to a desalination and cooling system, and particularly, to a combination of a single effect water-lithium bromide vapor absorption cycle (VAC) system and a forward osmosis with thermal-recovery (FO-TR) desalination system.

2. Description of the Related Art

Water desalination using Forward Osmosis (FO) technology has drawn significant attention recently as a low energy-consumption technology. The driving force in the FO system relies on the difference in chemical potential of the water, and hence, on osmotic pressure between the feed solution (FS) and the draw solution (DS) as the operating pressure rather than hydraulic pressure.

For the FO process, a semi-permeable membrane separates a draw solution having high osmotic pressure from saline feed water having dissolved solutes such as seawater of lower osmotic pressure. The FO driving force is the water chemical potential (pw) difference between the feed solution and the draw solution. DS has high osmotic pressure and low water chemical potential ($\mu w, DS$), while the FS has lower osmotic pressure but higher water chemical potential ($\mu w, FS$). The result of $\mu w, FS > \mu w, DS$ induces net water flow from the FS to the DS without applying pressure on the saline water such as in the case of a reverse osmosis (RO) system.

Generally, the main energy consumption step in an FO desalination system is the DS regeneration process. Among different methods for DS regeneration, is the heating of the DS to liberate fresh water and reconcentrate the DS again in a process called thermal recovery. In a thermal draw solution regeneration system, a special thermo-responsive draw solution (TRDS) is used to absorb fresh water from the feed seawater, while thermal energy is used to regenerate the DS from the diluted DS.

SUMMARY

A desalination and cooling system includes a single effect water-lithium bromide vapor absorption cycle (VAC) system and a forward osmosis with thermal-recovery (FO-TR) desalination system. The FO system employs a Thermo-Responsive Draw Solution (TRDS). Fresh water, i.e., desalinated water, flows from the FS to the TRDS without application of pressure on the saline water. Afterwards, only thermal energy is required to extract fresh water from the TRDS and recover or regenerate the draw solution. The VAC system serves as a cooling source for cooling or air conditioning applications, generating waste heat as a result. The waste heat generated by the VAC system provides the thermal energy needed to recover the draw solution (DS). The VAC system can be powered by low-grade heat sources like solar thermal energy.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

A desalination and cooling system includes a forward osmosis with thermal recovery (FO-TR) desalination system and a water-lithium bromide (LiBr) vapor absorption cycle (VAC) system. The combination of the desalination system and the VAC system allows the desalination system to use rejected thermal energy from one or more cooling units associated with the VAC system.

The FO-TR desalination system can include a forward osmosis (FO) unit in which a semi-permeable membrane separates saline feed water from a draw solution having a higher osmotic pressure than the feed water. As a result, feed water flows from the feedwater side (FS) of the FO unit to the draw solution side (DS) of the FO unit without application of pressure. The draw solution can be a thermo-responsive draw solution (TRDS). When the TRDS extracts fresh water or desalinated water from the saline water feed stream, the TRDS becomes a diluted solution. To re-concentrate the diluted TRDS and extract fresh water therefrom, thermal energy can be applied to the diluted TRDS, e.g., in a Draw Solution Recovery Chamber (DSRC).

The VAC system can include an evaporator/absorber vessel and a generator. The evaporator/absorber vessel includes an evaporator that provides a cooling source for water that has been warmed after use in cooling applications (consumer cooling units) and an absorber in which a LiBr solution is sprayed to absorb refrigerant vapor coming from the evaporator. The heat produced from this process in the absorber provides a heating source for feed seawater flowing into the absorber through absorber coils. The generator receives the diluted LiBr solution from the absorber and separates water vapor from the LiBr solution. The separated hot vapor can be used as a heating source for the DSRC to withdraw fresh water from the TRDS and concentrate the TRDS. Thus, waste heat generated from the cooling application provides thermal heat energy for heating both the TRDS and the feed saline water. Heating the feed stream before the feed stream enters the FO can improve water permeability through the FO membrane and increase product yield.

Figure 1:
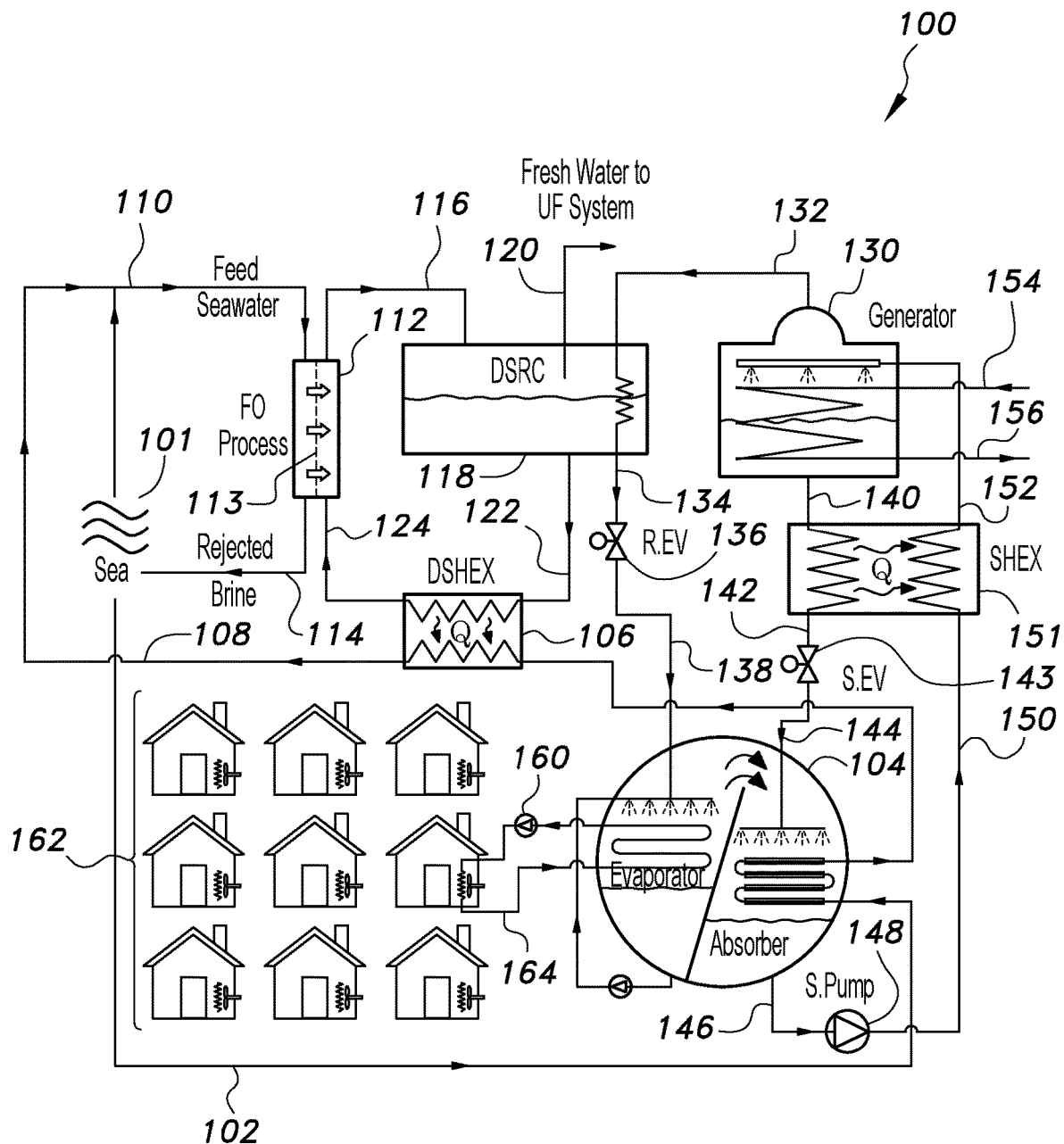
FIG. 1 is a schematic diagram of a desalination and cooling system, showing operation in a combined desalination and cooling mode or configuration.

In the embodiment depicted in FIG. 1, the system, designated 100, operates as both a desalination system and a cooling system. As described herein, the vapor absorption cycle (VAC) system includes evaporator/absorber unit 104 and generator 130. Feed saline water from a saline water source 101 is introduced into the system 100 via first conduit 102 and directed to coils on the absorber side of the evaporator/absorber unit 104 to cool the absorber of the evaporator/absorber unit 104 and, thereby, absorb heat. The heated saline water from the evaporator/absorber unit 104 is then directed to a draw solution heat exchanger (DSHEX) 106 for further heating. The DSHEX 106 can be any suitable heat exchanger. Heated saline water outputted from the DSHEX 106 is directed via conduit 108 through feed inlet port 110 to forward osmosis (FO) unit 112. To reduce the feedwater's temperature, cold saline water from saline water source 101 can be mixed with the heated feed water in the third conduit 108 before the heated feed water is introduced into the FO unit 112.

The FO unit 112 includes a semi-permeable membrane 113 that separates the heated saline feed water from a concentrated draw solution (DS) having a higher osmotic pressure than the feed water. The DS extracts pure water from the feed saline water across the FO membrane and becomes diluted DS. The diluted DS is then supplied to Draw Solution Recovery Chamber (DSRC) 118 via conduit 116 where it is heated by vapor generated in the VAC generator 130. The latent heat from the vapor separates freshwater from the DS, providing a freshwater stream and a heated and concentrated DS stream. The freshwater stream can be directed to a product storage tank via conduit 120. The heated and concentrated DS stream can be directed to heat-producing coils of the DSHEX 106 via conduit 122 for cooling before being directed to the FO 112 via conduit 124. The extracted freshwater flowing through conduit 120 from the FO 112 can be directed to one or more other filtration systems, prior to being collected in the product storage tank.

As mentioned previously, the VAC generator 130 can produce the vapor that is passed to the DSRC 118 via conduit 132. Latent heat from the vapor provides the thermal energy needed to heat the diluted draw solution (DS) in the DSRC 118. Afterwards, condensed vapor from the DSRC flows to refrigerant expansion valve (R.EV) 136 via conduit 134. The R.Ev 136 throttles the liquid to a low pressure and temperature liquid-vapor mixture that flows to sprayers in the evaporator portion of the evaporator/absorber unit 104 via conduit 138. The throttled refrigerant can have a temperature ranging from about 5° C. to about 6° C. The throttled refrigerant can be sprayed over the coils of the evaporator in the vessel 104 to cool warm water flowing through the coils from one or more air conditioning or cooling units 162 via conduit 164, thereby providing chilled water. The chilled water can be returned to the one or more air conditioning units 162 via conduit 160 for cooling applications. After use, the chilled water (now heated) from the one or more air conditioning units 162 can again be returned to the evaporator coils. The one or more air conditioning units can include pumps, fans, and controlling valves for producing air conditioning using the chilled water.

After the refrigerant is sprayed over the coils of the evaporator in the vessel 104, the refrigerant evaporates and becomes vapor that flows to the VAC's absorber through an opening between the evaporator and the absorber of vessel 104. A concentrated LiBr solution can be sprayed through the vapor on the absorber side. The LiBr solution can absorb the vapor and become a diluted LiBr solution. As, this absorption process is exothermic, cold saline water transferred from the saline water container via conduit 102 can cool the absorber side of the vessel 104, as discussed previously.

The diluted LiBr solution can be pumped from conduit 146 through conduit 150 to Solution Heat Exchanger (SHEX) 151 using solution pump 148. The pressurized and diluted LiBr solution can then flow through Solution Heat Exchanger (SHEX) 151 and gain heat emitted from the heat-producing coils of the heat exchanger. The heated LiBr solution can then be supplied to the VAC's generator 130 and sprayed over the heating coils in the VAC Generator. The heating coils of the VAC generator can be heated by an external heating source. Contact with the heating coils brings the LiBr solution to a boil, forming a hot LiBr solution and a vapor. The hot LiBr solution flows through conduit 140 to heat-producing coils of the SHEX 151 for the heating of the diluted LiBr solution entering the SHEX 151 discussed previously. The resulting cooled LiBr solution leaving the SHEX is then throttled through Solution Expansion Valve S.EV 143 via conduit 142 before being sprayed over the absorber's coils in the evaporator/absorber vessel 104. The generated vapor in the VAC generator 130 can be fed to the DSRC 118 through conduit 132 and condensed by emitting latent heat to the diluted DS in the DSRC 118, as discussed previously.

The VAC generator 130 requires thermal energy that can be obtained from an external source, e.g., solar energy or waste heat from an industrial process. The thermal energy can be introduced through inlet coils 154 and leave through exit coils 156. Thermal energy, in the form of a motive steam, boils the diluted LiBr solution and creates the water vapor, described previously, which is fed to the DSRC 118 and condensed by emitting latent heat to the diluted DS in the DSRC 118. Heating the diluted DS causes pure water to separate from the DS. The DSRC 118 serves as a condenser for the VAC Generator.

Figure 2:
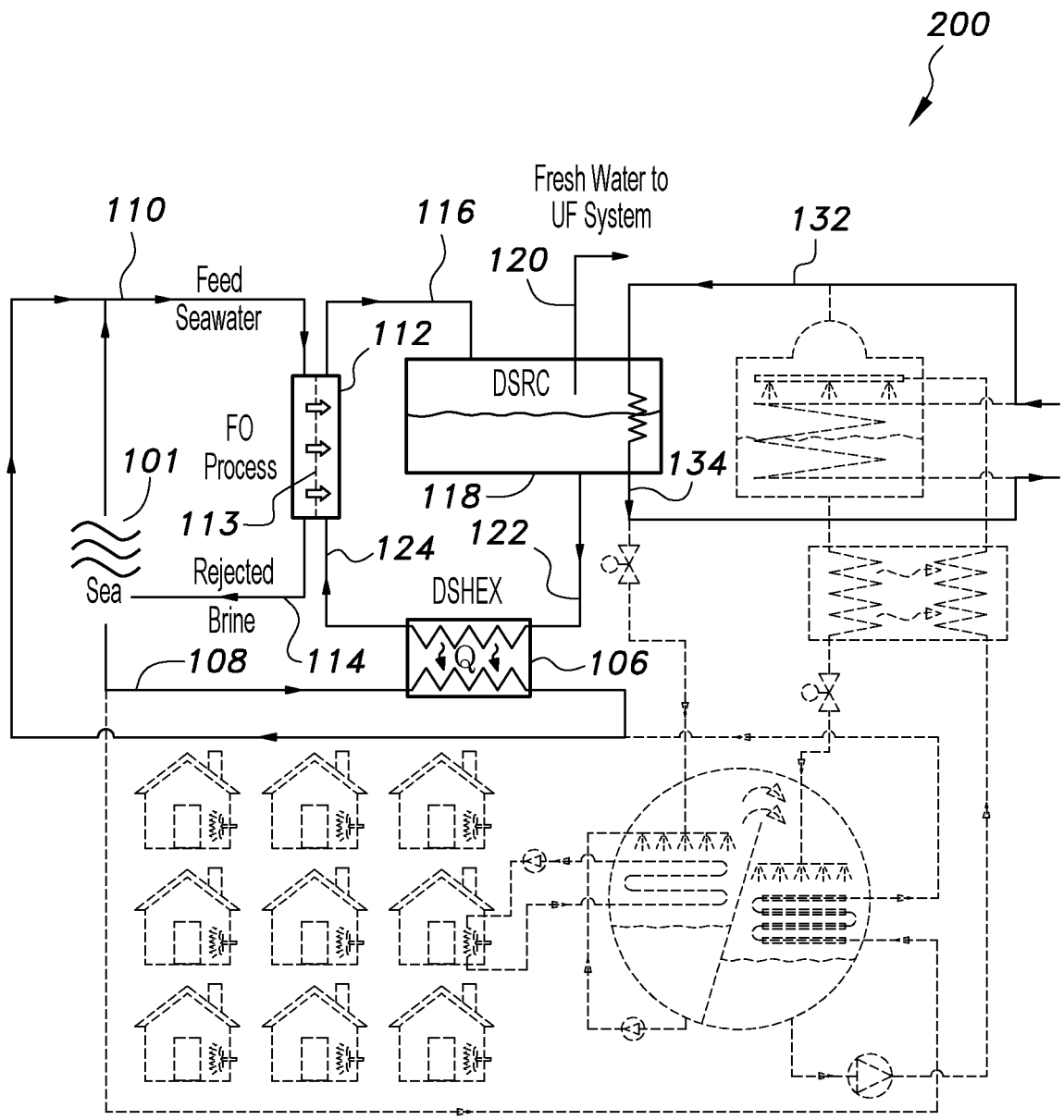
FIG. 2 is a schematic diagram of a desalination and cooling system, showing operation in a desalination only mode or configuration.
Figure 3:
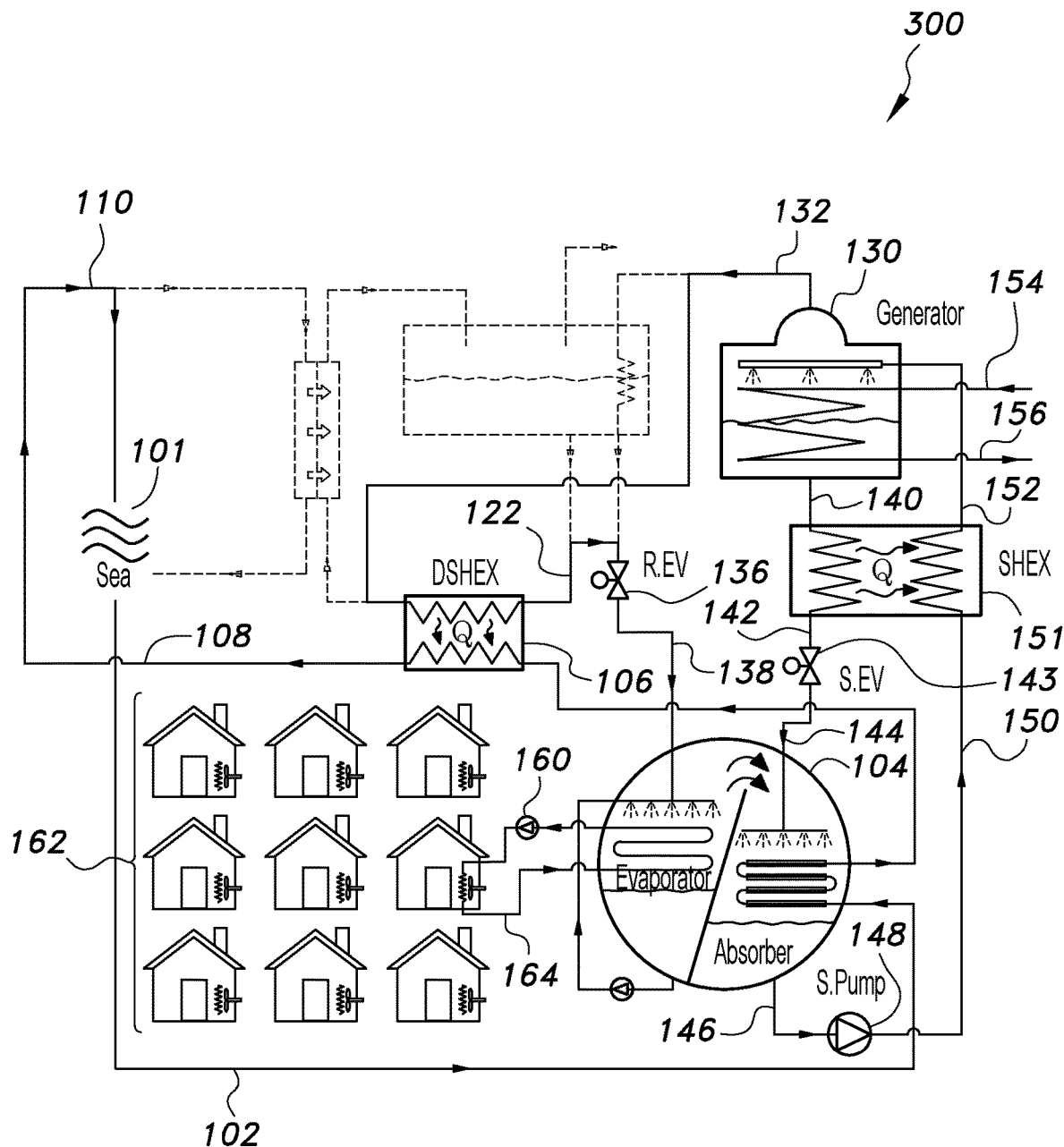
FIG. 3 is a schematic diagram of a desalination and cooling system, showing operation in a cooling only mode or configuration.

The system can be operated in three different modes: (a) combined desalination & cooling (FIG. 1); (b) desalination only (FIG. 2); and (c) cooling only modes (FIG. 3). FIG. 2 shows an embodiment of the system only in desalination mode, designated 200. In this mode, the VAC system is not used and the motive steam (from an external heating source) is used directly for heating the DSRC 118. The resulting condensate from the DSRC 118 returns to the external heating source and the hot, concentrated draw solution can be cooled in the DSHEX 106 using saline water from the saline water source. This saline water can then be used as a feed for the FO process.

FIG. 3 shows an embodiment of the system only in cooling mode, designated 300. In this mode, the recovery chamber 118 cannot condense the vapor emitted from the VAC generator 130. As such, the DSHEX 106 can be used as a condenser for the VAC generator 130. Saline water can be directed to the evaporator/absorber portion 104 and used for condensing the vapor in the DSHEX 106. The condensed vapor leaving the DSHEX 106 van be throttled in the RE.V 136 and used as a refrigerant in the evaporator of the evaporator/absorber vessel 104.

In experiment, the system 100, supplied with motive steam having a temperature of about 130° C. and consuming about 250 kW of thermal energy, separated 130 m$^3$/d of desalted water from a thermo-responsive draw solution having a temperature of about 85° C. The FO system consumed 1.4 kW h/m$^3$ of electric energy. The VAC system supplied 50.3 RT of chilled water at 10° C. and consumed 25.0 kW of electric power using a conventional vapor compression chiller.

The system can include one or more temperature sensors and one or more pressure sensors. For example, one or more temperature sensors can be provided for measuring a temperature of the draw solution leaving the forward osmosis (FO) unit 112 and a temperature of the heated saline water leaving the evaporator/absorber unit 104. Additionally, a pressure sensor can be provided to measure the pressure differential of the flow of the LiBr solution across the pump 148. It should be understood that temperature sensors may be any suitable type of temperature sensors, such as thermocouples or the like. Similarly, it should be understood that each of pressure sensors may be any suitable type of pressure sensors, gauges or the like. A controller may be provided for communicating with each of temperature sensors each of the pressure sensors, pump 148, and or other components of the system. It should be understood that the controller may be any suitable type of controller, processor, programmable logic controller, or a personal computer.

It is to be understood that the desalination and cooling system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A desalination and cooling system, comprising:
    a desalination system, including:
        a forward osmosis unit having a feed saline water portion, a concentrated draw solution portion, and a semi-permeable membrane separating the feed saline water portion from the draw solution portion,
        a draw solution recovery chamber in fluid communication with the forward osmosis unit for receiving diluted draw solution from the forward osmosis unit and outputting, fresh water, a condensed vapor, and a concentrated draw solution, and
        a draw solution heat exchanger in fluid communication with the draw solution recovery chamber and the forward osmosis unit for cooling the heated draw solution from the draw solution recovery chamber; and
    a vapor absorption cycle (VAC) system, including:
        a refrigerant expansion valve for throttling condensed vapor output from the draw solution recovery chamber to provide a refrigerant,
        an evaporator/absorber vessel including an evaporator portion for chilling warm water supplied from one or more air conditioning units with the refrigerant provided by the refrigerant expansion valve, and an absorber portion for absorbing refrigerant vapor received from the evaporator with LiBr solution to form a diluted LiBr solution,
        a generator for separating water vapor from the diluted LiBr solution output from the evaporator/absorber vessel and forming a hot LiBr solution and a vapor, the generator being in communication with an external heat source,
        a pump;
        a solution heat exchanger in fluid communication with the pump and the generator for heating the diluted LiBr solution output from the absorber using heat supplied by the hot LiBr solution output from the generator and outputting a cooled LiBr solution, and
        a solution expansion valve in fluid communication with the absorber and the solution heat exchanger for throttling the cooled LiBr solution output from the solution heat exchanger.

2. The desalination and cooling system of claim 1, wherein the absorber portion of the evaporator/absorber vessel comprises sprayers and an absorber coil below the sprayers, the sprayers being configured for spraying the throttled LiBr solution on the absorber coil.

3. The desalination and cooling system of claim 1, wherein the generator comprises heating coils heated by the external source and sprayers above the heated coils, the sprayers being configured for spraying the diluted LiBr solution on the heating coils.

4. The desalination and cooling system according to claim 1, wherein the evaporator portion includes spray nozzles and evaporator coils below the spray nozzles, the spray nozzles being in communication with the refrigerant expansion valve for receiving the refrigerant therefrom.

5. A method for using the desalination and cooling system recited in claim 1, comprising:
    collecting water warmed after use by one or more air conditioning units in the evaporator portion of the evaporator/absorber vessel;
    cooling the warm water in the evaporator portion with refrigerant produced in the refrigerant expansion valve to provide a chilled water and a refrigerant vapor;
    supplying the chilled water to the one or more air conditioning units;
    supplying a throttled LiBr solution to the absorber portion of the evaporator/absorber vessel;
    absorbing the refrigerant vapor with the LiBr solution to provide a diluted LiBr solution;
    heating a stream of saline water in the absorber portion of the evaporator to provide a heated saline water;
    supplying the diluted LiBr solution to the solution heat exchanger to provide a heated, diluted LiBr solution;
    heating the diluted LiBr solution in the generator to further heat the LiBr solution and provide a hot LiBr solution and a vapor;
    supplying the hot LiBr solution to the solution heat exchanger for cooling;
    throttling the cooled LiBr solution from the solution heat exchanger to provide the throttled LiBr solution;
    supplying the warm saline water to the draw solution heat exchanger to provide a hot saline water;
    supplying the hot saline water to the feedwater side of the forward osmosis unit to allow fresh water from the feed saline water portion to be drawn into the draw solution side and provide a diluted draw solution;
    transferring the diluted draw solution to the draw solution recovery chamber;
    heating the diluted draw solution in the draw solution recovery chamber using latent heat from the vapor produced in the generator to provide a stream of freshwater, a condensed vapor and a hot, concentrated draw solution;
    transferring the hot, concentrated draw solution to the draw solution heat exchanger; and
    supplying the condensed vapor to the refrigerant expansion valve to produce the refrigerant.

6. A method for using the desalination and cooling system recited in claim 1, comprising:
    supplying feed saline water to the feed saline water portion of the forward osmosis unit;
    drawing fresh water from the feed saline water portion into the draw solution portion to provide a diluted draw solution;
    supplying the draw solution recovery chamber with the diluted draw solution;
    heating the diluted draw solution in the draw solution recovery chamber using latent heat from vapor produced from the generator to provide fresh water, a condensed vapor, and a hot, concentrated draw solution;
    transferring the condensed vapor to the refrigerant expansion valve to produce the refrigerant;
    transferring the refrigerant to sprayers in the evaporator portion of the evaporator/absorber vessel;
    spraying the refrigerant over coils of the evaporator vessel to cool water flowing through the coils from the air conditioning units to provide chilled water;
    returning the chilled water to the air conditioning units;

absorbing refrigerant vapor received from the evaporator portion in the absorber portion with LiBr solution to form a diluted LiBr solution;

supplying the draw solution heat exchanger with the hot, concentrated draw solution; and cooling the hot, concentrated draw solution in the draw solution heat exchanger.

7. A method for using the desalination and cooling system recited in claim 1, comprising:

condensing vapor output from the absorption cycle generator in the draw solution recovery chamber;

supplying the condensed vapor to the refrigerant expansion valve to provide a refrigerant, providing the refrigerant to the evaporator/absorber vessel;

chilling warm water supplied from one or more air conditioning units with the refrigerant to provide chilled water and a refrigerant vapor; and absorbing the refrigerant vapor received with LiBr solution to form a diluted LiBr solution.

* * * * *